United States Patent [19]

Shyu et al.

[11] Patent Number: 5,120,936

[45] Date of Patent: Jun. 9, 1992

[54] MULTIPLEX HEATING SYSTEM WITH TEMPERATURE CONTROL

[75] Inventors: Jia-Ming Shyu, Hsinchu; Wei-Chiang Lin, Touyuan, both of Taiwan

[73] Assignee: Industrial Technology Research Institute, Hsinchu, Taiwan

[21] Appl. No.: 570,826

[22] Filed: Aug. 22, 1990

[51] Int. Cl.$^5$ .............................. H05B 1/02
[52] U.S. Cl. ..................... 219/497; 219/499; 219/508; 219/483; 219/486; 307/38
[58] Field of Search ............... 219/494, 499, 497, 501, 219/505, 506, 483, 486, 508, 509; 307/38–41

[56] References Cited

U.S. PATENT DOCUMENTS

| | | | |
|---|---|---|---|
| 3,789,190 | 1/1974 | Orosy et al. | 219/499 |
| 4,086,466 | 4/1978 | Scharlack | 219/499 |
| 4,314,143 | 2/1982 | Bilstad et al. | 219/506 |
| 4,374,321 | 2/1983 | Cunningham, Jr. et al. | 219/497 |
| 4,410,794 | 10/1983 | Williams | 219/486 |
| 4,506,146 | 3/1985 | Rice et al. | 219/486 |
| 4,511,791 | 4/1985 | Desai et al. | 219/483 |
| 4,657,572 | 4/1987 | Desai et al. | 219/486 |
| 4,786,799 | 11/1988 | Welle, Jr. et al. | 219/486 |
| 4,829,159 | 5/1989 | Braun et al. | 219/486 |

Primary Examiner—Mark H. Paschall
Attorney, Agent, or Firm—Flehr, Hohbach, Test, Albritton & Herbert

[57] ABSTRACT

A multiplex heating system for measuring and regulating the temperature of a plurality of heating elements is disclosed. The heating system includes a plurality of heating elements, which also function as temperature sensing elements, that exhibit a known change in resistance as a function of temperature. The heating system further includes a power source, a control apparatus for regulating the respective heating power of each heating element, a measurement apparatus for measuring changes in resistance in the heating elements, and a plurality of switching arrangements. Each switching arrangement is coupled between one of the heating elements and, alternately, the control apparatus and the measurement apparatus, connecting the heating element to either the control apparatus or the measurement apparatus.

8 Claims, 3 Drawing Sheets

MULTIPLEX HEATING SYSTEM WITH TEMPERATURE CONTROL

BRIEF DESCRIPTION OF THE INVENTION

The present invention relates generally to a heating system which incorporates heating elements that also function as temperature sensors. More particularly, it relates to a heating system in which several heating elements are regulated by a central control unit.

BACKGROUND OF THE INVENTION

Conventional heating systems regulate the temperature of the heating element using two separate devices. A temperature sensor measures the temperature of the heating element, sending a signal to a temperature controller. The temperature controller evaluates the signal to determine when to supply power to the heating element, keeping the temperature within a predetermined range. Compensation wires connect the temperature signal to the temperature controller.

In a conventional heating system, one temperature sensor with a corresponding compensation wire is needed for each heating element. If the system contains several heating elements, it will require several temperature sensors and compensation wires. While the conventional system sufficiently regulates the temperature of the heating elements, it is quite bulky. As a result, the number of possible applications for the system is limited.

The actual temperature of a heating element is not uniform throughout the device. The temperature sensor detects the temperature of that portion of the element to which it is attached. The measured temperature will vary with the positioning of the temperature sensors. The measured temperature also deviates from the actual temperature even at that single location because of a propagation delay in the interface between gas, liquid, and solid. Some situations require precise temperature measurements to closely regulate a heating system.

U.S. Pat. No. 3,789,190 issued to D. Orosy et al on Jan. 29, 1974 discloses an electrical heating device which incorporates heating elements that also function as temperature sensors. The Orosy heating element uses materials in which the resistance changes linearly with respect to a change in temperature. One heating element serves as the fourth leg of a Wheatstone bridge. A change in temperature causes a change in resistance which results in a bridge imbalance. The system uses the bridge imbalance to regulate the power supply to the heating element. This regulation is accomplished by turning the power supply to the heating elements on and off for variable periods of time dependent upon the temperature of the heating element. The Orosy temperature control system offers more precision when regulating a single heating element than the conventional heating system.

Another prior art heating systems controls the temperature of the heating elements by connecting or disconnecting the power supply once the measured temperature leaves the desired range. When the temperature drops below the lower limit, the power supply is connected to the heating element, causing the temperature to increase. When the measured temperature reaches the upper limit, the power supply is disconnected and the temperature gradually decreases. As a result, the temperature oscillates back and forth between the upper and lower limit, spending little time at a single desired temperature. A heating system which regulates a heating element by adjusting the power supply level would have better control over the actual temperature of the element. Instead of supplying full power over variable time periods as in the prior art, the system could supply power in increments, thus preventing the extreme oscillation of the conventional systems.

Certain conditions require a heating system which regulates several heating elements with a central control unit. In such multiple element heating systems, the use of heating elements which function as temperature sensors is less bulky and more accurate than the conventional system. Such a heating system which controls several heating elements with a central control unit is even more accurate since each element can be regulated with respect to the others. A central control unit eliminates the need for a controller for each heating element, reducing the number of parts needed for the system. This further reduces the overall bulk of the heating system. A central control also improves the reliability of the system.

OBJECTS AND SUMMARY OF THE INVENTION

The general object of the present invention is to provide a heating system to regulate heating elements, wherein the heating elements also function as temperature sensing elements.

A further object of the present invention is to provide a heating system in which a central controller regulates a plurality of heating elements.

A further object of the present invention is to provide a heating system which continuously varies the amount of power supplied to the heating element.

A particular object of the present invention is to provide a real time multiplex heating system wherein the temperature is maintained by plurality of heating elements which are regulated by a central controller.

The foregoing and other objects are achieved by coupling a microcomputer to thyristors, switching means, and a programmable peripheral interface. The switching means connects the heating element to a bridge circuit for temperature measurement, and then reconnects the element to the thyristor. An analog to digital converter converts the amplified voltage signal from the bridge circuit into a digital signal. The digital signal is sent to the microcomputer via the programmable peripheral interface. The microcomputer determines the actual temperature from the digital signal, compares it to a preset value, and converts the difference into a number of timing control pulses. The thyristor firing delay angle, which controls the power level, is determined by the number of timing control pulses.

BRIEF DESCRIPTION OF THE DRAWINGS

Other objects and advantages of the present invention will become apparent upon reading the following description and upon reference to the drawings, in which.

DETAILED DESCRIPTION OF THE INVENTION

Figure 1:
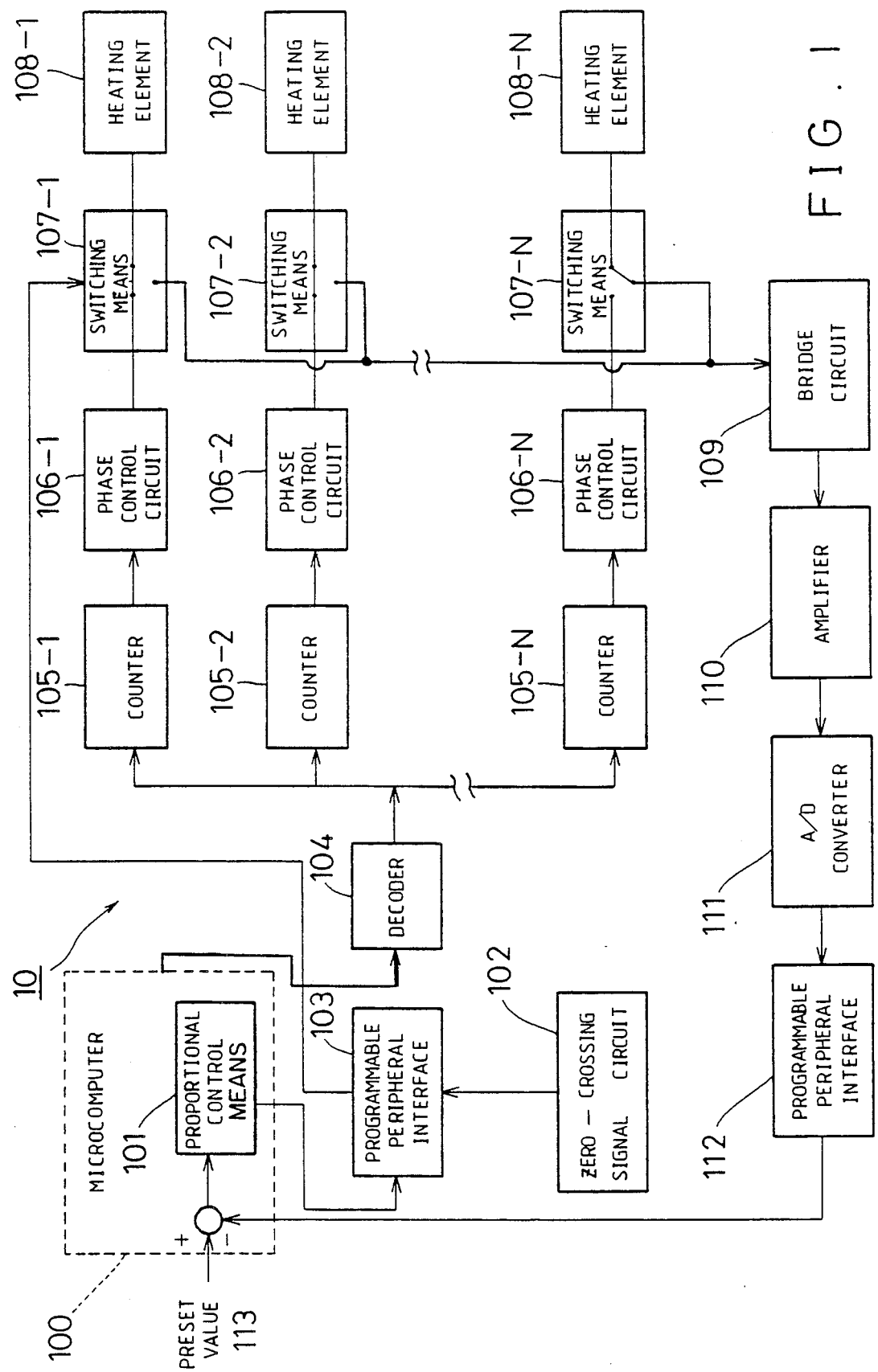
FIG. 1 is a block diagram of a multiplex heating system in accordance with the present invention.

Referring to FIG. 1, a heating system 10 of the present invention is depicted. Heating system 10 includes a microcomputer 100 and a plurality of heating elements 108 (from 108-1 to 108-N). Microcomputer 100 is the control center of heating system 10. It alternately samples the temperatures of each heating element 108 at predetermined time intervals. The sampling time depends on the response time of the system. A plurality of switching means 107-1 to 107-N are each coupled to their respective heating elements 108-1 to 108-N.

Figure 2:
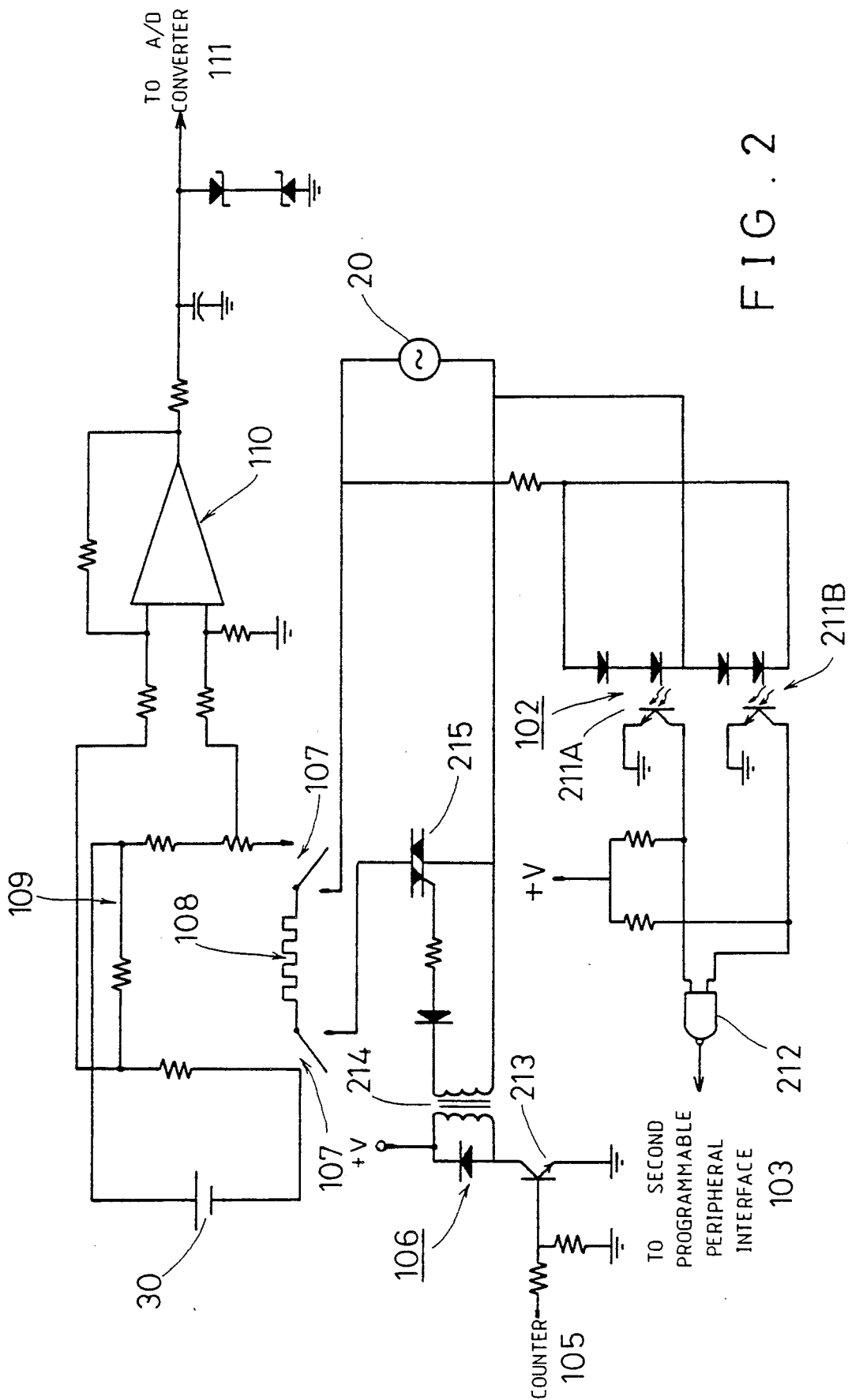
FIG. 2 is a schematic diagram of the control circuits of a heating system in accordance with the present invention but represented with a single heating element.

When sampling one of the heating elements, for instance 108-N, microcomputer 100 actuates the corresponding switching means 107-N. Switching means 107-N then separates the heating power from heating element 108-N and connects heating element 108-N to a bridge circuit 109. Heating element 108-N becomes the fourth leg of a Wheatstone bridge circuit 109, as shown in FIG. 2. The other heating elements 108 remain connected to heating power source 20 (shown in FIG. 2). Switching means 107 may be a relay. Heating elements 108 are constructed from a material in which the change in resistance as a function of the change in temperature is known. In the preferred embodiment, the resistance of the material varies linearly with the change in temperature. The change in resistance causes a change in voltage of bridge circuit 109. Since the relationship between changes in temperature and resistance is known, the temperature of heating element 108 can be easily obtained.

In a preferred embodiment, heating system 10 utilizes an alternating current (A. C.) power source 20 during the heating procedure and a direct current (D. C.) power source 30 during the temperature measuring procedure. Connecting heating element 108 to bridge circuit 109 generates unwanted resistance transients from switching means 107 and heating element 108. To avoid interference from these transients, a short predetermined time passes before the voltage difference signal of bridge circuit 109 passes to an amplifier 110 which is coupled to bridge circuit 109. The length of the time delay depends on the properties of switching means 107 and heating element 108. Generally, the delay is in the range of tens of milliseconds.

Amplifier 110 amplifies the voltage difference signal of bridge circuit 109 to facilitate processing and prevent interference. An analog-to-digital (A/D) converter 111 which is coupled to amplifier 110 receives the amplified analog signal and converts it into a corresponding digital signal. Switching means 107 then connects its respective heating element 108 to the heating power source 20 as adjusted by its respective phase control circuit 106.

Those skilled in the art will realize that the corresponding digital signal of A/D converter 111 is not the actual temperature value. In the present embodiment, the digital signal passes through a programmable peripheral interface 112 to microcomputer 100 where it may, if desired, then be converted to the actual temperature value. A preset value 113 which represents the desired temperature level of the heating element has been selected and preset by the user. Microcomputer 100 calculates the difference between preset value 113 and the actual temperature value, and then converts the difference into a number of timing control pulses. The number of timing control pulses may be obtained through use of software or circuitry. This number is sent to a decoder 104. Decoder 104 is coupled to a plurality of counters 105-1 to 105-N, each of which is connected to its respective phase control circuit 106. Counter 105 counts the timing control pulses and, dependent upon the count, sends a control pulse to phase control circuit 106. Phase control circuit 106 then adjusts the amount of power supplied to heating element 108, thus reducing the difference between the actual temperature value and preset value 113.

Referring now to FIG. 2, the detailed operation of the control circuits used in the preferred embodiment will be described with respect to only one heating element 108. A zerocrossing signal circuit 102 is coupled to a programmable peripheral interface 103 as shown in FIG. 1. Zero-crossing signal circuit 102, which includes two photo couplers 211A, 211B, generates the interruption and timing signals. Photo couplers 211 may be photo transistors. Since the connection relationship of the circuit 102 is clearly depicted in FIG. 2, further description is deemed unnecessary. When the input A.C. voltage is not at the zero level, the output of one photo coupler 211A is low while the output of the other photo coupler 211B is high. Thus, the output of NAND gate 212 is high. When the input A.C. voltage is at the zero level, both photo couplers 211A, 211B have high outputs. Thus, the output of NAND gate 212 is low. For example, if the frequency of the A.C. power source 20 is 60 Hz, zero crossing signal circuit 102 can generate one hundred and twenty zero crossing signals per second.

As mentioned above, microcomputer 100 generates a number of timing control pulses from the difference between preset value 113 and the actual temperature value. The number of pulses determines the firing delay angle of a thyristor or triac 215. After measuring the temperature of heating element 108, microcomputer 1?0 sends the number of timing pulses together with the address of the particular heating element measured to decoder 104. Decoder 104 identifies which of heating elements 108 is to be adjusted by the timing control pulses and sends the pulses to its respective counter 105. Counter 105 counts the number of timing pulses and sends a control pulse signal to phase control circuit 106 dependent upon that number of pulses. The control pulse signal turns on a transistor 213 of phase control circuit 106 which activates a pulse transformer 214. Pulse transformer 214 sends a firing pulse to fire triac 215 at a firing delay angle which is determined by the firing pulse.

The power supplied to the system is regulated by controlling the firing delay angle. For example, the available heating power varies from 0% to 100%, and the firing delay angle varies from 0° to 180°. When the firing delay angle is 0°, the power output is at 100%. When the firing delay angle equals 180°, the heating power is at 0%. The relationship between the heating power and the firing delay is not linear. The microcomputer 100 calculates the amount of heating power which should be supplied to heating element 108 so as to bring the actual temperature value closer to the preset value 113 and using the relationship between the heating power and firing delay angle, determines the number of timing pulses. This allows the present invention, except for the temperature sampling time, to continuously control the temperature of the system providing power to the heating element during every cycle of the alternating current electrical power source. Instead of switching the power on during some cycles of the power source and off during other cycles, the system varies the amount of power supplied by changing the firing delay angle in response to any change of temperature in the heating element.

Figure 3:
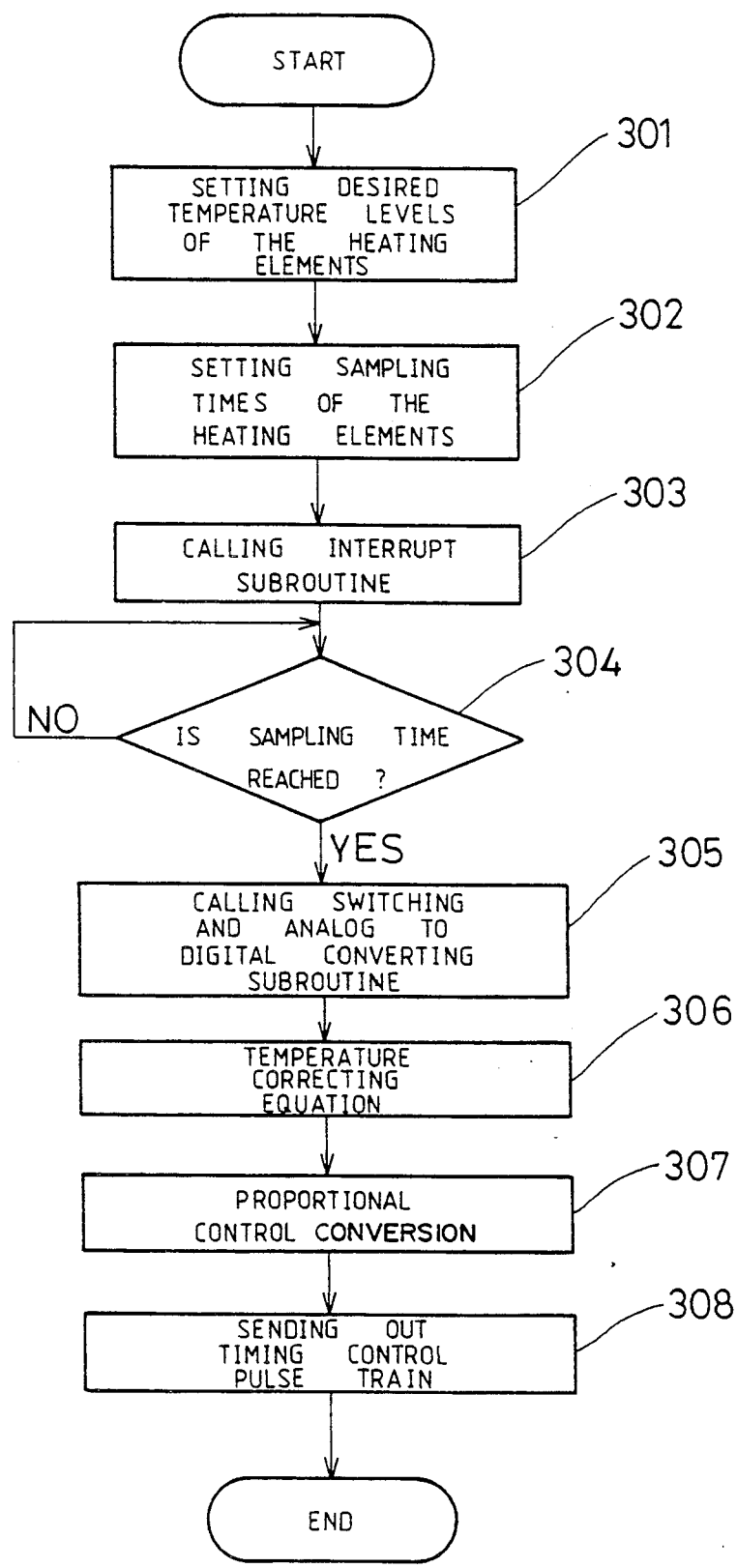
FIG. 3 is a flow chart depicting the control program of a multiplex heating system in accordance with the present invention.

Referring to FIG. 3, a flow chart of the control program that is stored and run in microcomputer 100 is depicted. The first step in using heating system of the present invention is presetting the desired temperature levels (procedure 301) and sampling times (procedure 302) of heating elements 108 into microcomputer 100. Different heating elements have different sampling times. To enable the heating system to count time, zero crossing signal circuit 102 generates interruption signals and timing signals (procedure 303). When the sampling time of one of the heating elements 108 is reached (procedure 304), the microcomputer calls the switching and analog to digital converting subroutines into play (procedure 305). Switching means 107 connects heating element 108 to bridge circuit 109. The voltage difference signal of bridge circuit 109 is detected and sent to amplifier 110, and the amplified signal is then sent to A/D converter 111. Once the signal has passed through A/D converter 111, switching means 107 reconnects heating element 108 with the heating circuit. Microcomputer 100 corrects the signal after it has passed through A/D converter 111 to obtain the measured temperature value (procedure 306). The corrected measured temperature value is then compared to preset value 113. Proportional control means 101 converts the difference between the two values into a number of timing control pulses (procedure 307). Counter 105 sends a control pulse signal to fire the thyristor, thus regulating the temperature of the heating element (procedure 308).

The heating system of the present invention contains the multiplex, time division, and temperature proportional control means as described above. The information of the heating element temperature may be displayed on a monitor connected to the microcomputer (not shown in the drawings). This information may also be stored in a memory file. The response speed of the system is faster and the measured temperature is closer to the actual value than in the conventional heating system. The present invention can be applied to a variety of uses, including hair dryers used in salons, handdriers, various heating devices used in the home, electric chafing dishes, electric solder irons, thermostatic tanks, and heating furnaces.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A multiplex heating system for measuring and regulating the temperature of a plurality of heating elements, said heating system comprising:
    (a) a plurality of heating elements which exhibit a known change in resistance as a function of change in temperature;
    (b) power means for supplying power to said heating elements;
    (c) control means coupled to said power means for regulating the respective heating powers of said plurality of heating elements;
    (d) single measurement means coupled to said control means for measuring said changes in resistance of said heating elements; and
    (e) a plurality of switching means, each coupled between one of said heating elements and, alternatively, said measurement means and said control means for switching said heating element between a first position wherein said heating element is connected with said power means through said control means and a second position wherein said heating element is connected with said measurement means.

2. A multiplex heating system as described in claim 1 wherein said measurement means comprises:
    (a) a bridge circuit coupled to said switching means such that, if said switching means is in said second position, said heating element serves as the fourth leg of said bridge circuit wherein the output of said bridge circuit is a voltage difference signal representing said change in resistance of said heating element;
    (b) an amplifier coupled to said bridge circuit for receiving and amplifying said voltage difference signal;
    (c) an analog to digital converter coupled to said amplifier for converting said amplified voltage difference signal into a digital signal; and
    (d) interface means coupled between said analog to digital converter and said control means for receiving said digital signal and sending said digital signal to said control means.

3. A multiplex heating system a described in claim 1 wherein said control means comprises:
    (a) a thyristor coupled between said power means and one of said switching means;
    (b) a clock circuit coupled to said power means for generating a clock signal; and
    (c) a microcomputer coupled to said clock circuit, said switching means, and said thyristor, said microcomputer including:
        (1) means for triggering said switching means at predetermined time intervals to alternately switch each of said heating elements to said second position;
        (2) means for receiving said digital signal from said interface means and determining the temperature value of said heating element;
        (3) means for comparing said determined temperature value with a predetermined temperature value and forming an error signal in response to said comparison; and
        (4) proportional control means for converting said error signal into a number of timing pulses, said number of timing pulses determining the firing delay angle of said thyristor.

4. A multiplex heating system as described in claim 3 wherein said power means comprises an alternating current power source.

5. A multiplex heating system as described in claim 4 wherein said clock circuit comprises a zero crossing signal circuit such that, when the input voltage of said alternating current power source crosses the zero level, said zero crossing signal circuit generates a zero crossing signal.

6. A multiplex heating system as described in claim 1 wherein said control means comprises:
 (a) a plurality of thyristors, each coupled between said power means and one of said switching means;
 (b) a clock circuit coupled to said power means for generating a clock signal; and
 (c) a microcomputer coupled to said clock circuit, said switching means, and each of said thyristors, said microcomputer including:
  (1) means for triggering said switching means at predetermined time intervals to alternately switch each of said heating elements to said second position;
  (2) means for receiving said digital signal from said interface means and determining the temperature value of said heating element;
  (3) means for comparing said determined temperature value with a predetermined temperature value and forming an error signal in response to said comparison; and
  (4) proportional control means for converting said error signal into a number of timing pulses, said number of timing pulses determining the firing delay angle of said thyristor.

7. A multiplex heating system as described in claim 6 wherein said power means comprises an alternating current power source.

8. A multiplex system as described in claim 7 wherein said clock circuit comprises a zero crossing signal circuit such that, when the input voltage of said alternating current power source crosses the zero level, said zero crossing signal circuit generates a zero crossing signal.

* * * * *